(12) United States Patent
Raja et al.

(10) Patent No.: US 10,535,346 B2
(45) Date of Patent: Jan. 14, 2020

(54) SPEECH PROCESSING COMPUTER SYSTEM FORMING COLLABORATIVE DIALOG DATA STRUCTURES

(71) Applicant: CA, Inc., New York, NY (US)

(72) Inventors: Preethi Raja, Telangana (IN); Jagadeeshwaran Karunanithy, Tamilnadu (IN); Shamayel Mohammed Farooqui, Telangana (IN); Jagadishwara Chary Sriramoju, Telangana (IN); Sai Kumar Bochkar, Telangana (IN)

(73) Assignee: CA, Inc., New York, NY (US)

( * ) Notice: Subject to any disclaimer, the term of this patent is extended or adjusted under 35 U.S.C. 154(b) by 33 days.

(21) Appl. No.: 15/834,667

(22) Filed: Dec. 7, 2017

(65) Prior Publication Data

US 2019/0180739 A1  Jun. 13, 2019

(51) Int. Cl.

| | | |
|---|---|---|
| *G10L 15/22* | (2006.01) | |
| *G10L 17/00* | (2013.01) | |
| *G10L 15/30* | (2013.01) | |
| *G10L 15/08* | (2006.01) | |
| *G10L 25/51* | (2013.01) | |
| *G06F 17/27* | (2006.01) | |
| *G10L 15/26* | (2006.01) | |
| *G06Q 10/10* | (2012.01) | |
| *H04R 1/40* | (2006.01) | |

(52) U.S. Cl.
CPC .......... *G10L 15/22* (2013.01); *G06F 17/279* (2013.01); *G10L 15/08* (2013.01); *G10L 15/26* (2013.01); *G10L 15/30* (2013.01); *G10L 17/005* (2013.01); *G10L 25/51* (2013.01); *G06Q 10/109* (2013.01); *G10L 17/00* (2013.01); *G10L 2015/088* (2013.01); *G10L 2015/223* (2013.01); *H04R 1/406* (2013.01)

(58) Field of Classification Search
CPC ....... G10L 17/00; G10L 17/005; G10L 15/00; G10L 15/26; G10L 15/265
See application file for complete search history.

(56) References Cited

U.S. PATENT DOCUMENTS

| | | | |
|---|---|---|---|
| 9,135,590 B1 | 9/2015 | Liu | |
| 2005/0007445 A1* | 1/2005 | Foote | H04N 7/142 348/14.08 |
| 2005/0143996 A1* | 6/2005 | Bossemeyer, Jr. | G10L 17/06 704/247 |
| 2008/0012701 A1* | 1/2008 | Kass | A61B 5/0002 340/539.11 |

(Continued)

*Primary Examiner* — Paras D Shah
(74) *Attorney, Agent, or Firm* — Kowert, Hood, Munyon, Rankin & Goetzel, P.C.

(57) ABSTRACT

A collaborative speech processing computer receives packets of sampled audio streams. The sampled audio streams are forwarded to a speech-to-text conversion server via a data network. Packets are received via the data network that contain text strings converted from the sampled audio steams by the speech-to-text conversion server. Speakers are identified who are associated with the text strings contained in the data packets. The text strings and the identifiers of the associated speakers are added to a dialog data structure in a repository memory. Content of at least a portion of the dialog data structure is displayed on a display device.

18 Claims, 5 Drawing Sheets

(56) References Cited

U.S. PATENT DOCUMENTS

| | | | |
|---|---|---|---|
| 2011/0288866 A1* | 11/2011 | Rasmussen | H04L 12/1831 704/246 |
| 2013/0144619 A1* | 6/2013 | Lord | G06F 3/165 704/235 |
| 2014/0164501 A1* | 6/2014 | Herger | H04N 7/15 709/204 |
| 2015/0121216 A1* | 4/2015 | Brown | G06N 3/006 715/707 |
| 2015/0350560 A1* | 12/2015 | Zhou | H04N 5/262 348/576 |
| 2016/0027442 A1* | 1/2016 | Burton | G10L 15/26 704/235 |
| 2016/0321462 A1* | 11/2016 | Bhogal | G06F 17/24 |
| 2016/0379169 A1* | 12/2016 | Chiyo | G06Q 10/00 704/235 |
| 2017/0220997 A1* | 8/2017 | Shima | G06Q 10/10 |
| 2017/0263245 A1* | 9/2017 | Mizumoto | G10L 15/08 |
| 2017/0310716 A1* | 10/2017 | Lopez Venegas | H04L 65/1083 |
| 2017/0324788 A1* | 11/2017 | Yoon | H04L 65/1069 |
| 2018/0083978 A1* | 3/2018 | Pantazelos | G06F 21/10 |
| 2018/0101281 A1* | 4/2018 | Nelson | G06F 3/04817 |
| 2018/0101823 A1* | 4/2018 | Nelson | G06Q 10/1095 |
| 2018/0190297 A1* | 7/2018 | Waltermann | G10L 17/08 |
| 2018/0218734 A1* | 8/2018 | Somech | G06Q 10/10 |
| 2018/0262885 A1* | 9/2018 | Still | H04W 4/043 |
| 2018/0267948 A1* | 9/2018 | Subramanya | G06Q 10/107 |

* cited by examiner

SPEECH PROCESSING COMPUTER SYSTEM FORMING COLLABORATIVE DIALOG DATA STRUCTURES

TECHNICAL FIELD

The present disclosure is related to speech processing computer systems and more particularly to voice recognition servers.

BACKGROUND

In software development and some other product development environments, team members huddle together each morning for a stand-up meeting where they review progress and essentially re-plan the project. During the daily meetings, which are called "scrums," a scrum master asks the team members these three questions that can include: what did you do yesterday; what will you do today; are there any impediments in your way. The scrum master functions to, for example: help the team to reach consensus for what can be achieved during a specific period of time; help the team to reach consensus during the daily scrum; help the team to stay focused and follow the agreed-upon rules for daily scrums; remove obstacles that are impeding the team's progress; and protect the team from outside distractions.

Tracking progress toward completing project tasks, task issues raised by team members, and the contributions by individual team members toward those tasks can be a time consuming process and which can interfere with the ongoing collaboration among team members and impede the free flowing discussions that are considered important to providing a supportive project environment.

SUMMARY

Some embodiments disclosed herein are directed to methods by a collaborative speech processing computer. Data packets of sampled audio streams are obtained. The sampled audio streams are forwarded to a speech-to-text conversion server via a data network. Data packets are received, via the data network, which contain text strings converted from the sampled audio steams by the speech-to-text conversion server. Speakers are identified who are associated with the text strings contained in the data packets. The text strings and the identifiers of the associated speakers are added to a dialog data structure in a repository memory. Content of at least a portion of the dialog data structure is output to a display device for display Some other related embodiments disclosed herein are directed to a collaborative speech processing computer. A network interface is configured to communicate with a speech-to-text conversion server. A processor is connected to receive the data packets from the network interface. A memory stores program instructions that are executable by the processor to perform operations. The operations include obtaining data packets of sampled audio streams. The sampled audio streams are forwarded to the speech-to-text conversion server via the network interface. Data packets containing text strings converted from the sampled audio steams by the speech-to-text conversion server, are received via the network interface. A project task is selected from among a plurality of project tasks defined in a project database based on a closest matching of words in the one of the text strings to a set of keywords for the project task that is among sets of keywords that have been defined for the plurality of project tasks. A group of candidate speakers are identified who are defined in the project database as being associated with the project task selected. Spectral characteristics of a voice contained in the sampled audio stream that was converted to the one of the text strings is compared to known spectral characteristics that are defined for the candidate speakers in the group. One person is selected as the speaker from among the candidate speakers in the group, based on a relatively closeness of the comparisons of spectral characteristics.

In a further embodiment, at least one wireless user terminal is selected that is determined to have been a source of one of the sampled audio streams and that is determined to not be licensed to one of the candidate speakers in the group. A microphone mute command is then sent to the at least one wireless user terminal selected to trigger temporary muting of a microphone of the at least one wireless user terminal.

Some other related embodiments disclosed herein are directed to another collaborative speech processing computer that performs operation that include obtaining data packets of sampled audio streams, and forwarding the sampled audio streams to the speech-to-text conversion server via the network interface. Data packets containing text strings converted from the sampled audio steams by the speech-to-text conversion server, are received via the network interface. A project task is selected from among a plurality of project tasks defined in a project database based on a closest matching of words in the one of the text strings to a set of keywords for the project task that is among sets of keywords that have been defined for the plurality of project tasks. A speaker is selected who is defined in the project database as being associated with the project task selected. A microphone is selected from among a plurality of microphones that is determined to more strongly sense voice of the speaker identified relative to the other microphones. A gain is increased that is applied to audio signals from the microphone selected.

It is noted that aspects described with respect to one embodiment disclosed herein may be incorporated in different embodiments although not specifically described relative thereto. That is, all embodiments and/or features of any embodiments can be combined in any way and/or combination. Moreover, methods, systems, and/or computer program products according to embodiments will be or become apparent to one with skill in the art upon review of the following drawings and detailed description. It is intended that all such additional methods, systems, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

According to various embodiments of the present disclosure, a collaborative speech processing computer receives packets of sampled audio streams. The sampled audio streams are forwarded to a speech-to-text conversion server via a data network. Packets are received via the data network that contain text strings converted from the sampled audio steams by the speech-to-text conversion server. Speakers are identified who are associated with the text strings contained in the packets. The text strings and the identifiers of the associated speakers are added to a dialog data structure in a repository memory. Content of at least a portion of the dialog data structure is displayed on a display device.

The collaborative speech processing computer may be part of a virtual scrum master system. For example, in some embodiments a virtual scrum master is provided as an electronic tool (e.g., server) that facilitates the textual recordation and organization of spoken conversations by scrum meeting attendees. The virtual scrum master tool listens to spoken conversations by scrum meeting attendees, converts a stream of audio samples of the spoken conversations to a data packets containing digital samples of the audio stream, dynamically identifies speakers during the conversations, and associates identifiers for the speakers to the converted text strings. The virtual scrum master tool can then organize the converted text strings with the associated speaker identifiers into a scrum knowledgebase. The scrum knowledgebase can be mined for project planning, tracking progress attributable to individual team members, identifying risks with individual project deliverables, etc.

Figure 1:
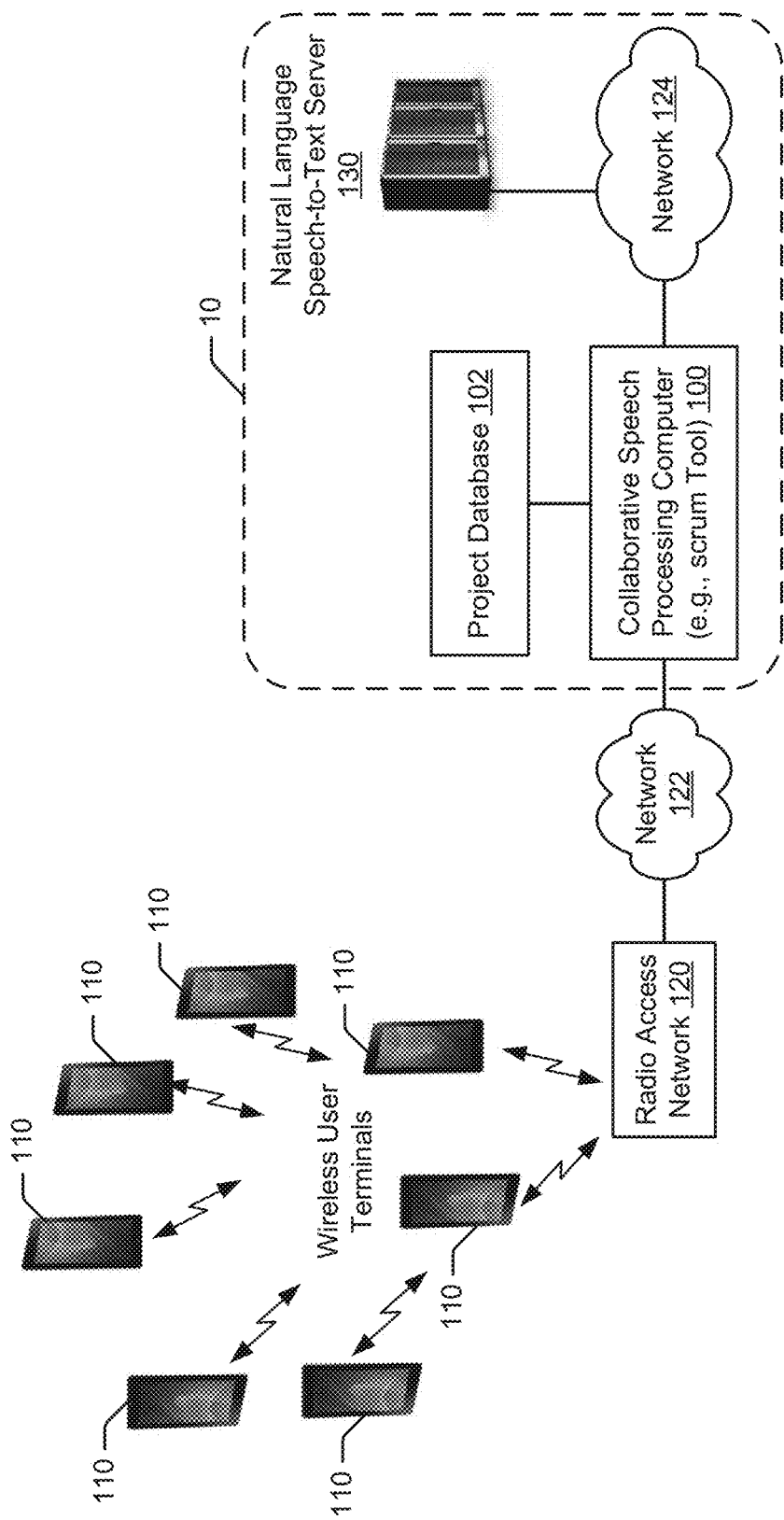
FIG. 1 is a block diagram of a computer system that includes a collaborative speech processing computer that operationally interfaces with a project database and a natural language speech-to-text server in accordance with some embodiments.

FIG. 1 is a block diagram of a computer system that includes a collaborative speech processing computer 100 that operationally interfaces with a project database 102 and a natural language speech-to-text server 130 in accordance with some embodiments. The collaborative speech processing computer 100 may form a virtual scrum master tool in accordance with some embodiments. The collaborative speech processing computer 100 may communicate through a data network 124, e.g., private network and/or public network (Internet), with the natural language speech-to-text server 130.

One approach includes having scrum meeting attendees set their wireless terminals 110, e.g., mobile phones, tablet computers, etc., on a table nearest their seated/standing position. The collaborative speech processing computer 100 forms a communication link through a radio access network 120 (e.g., Bluetooth, WiFi, and/or cellular radio interface) with the wireless terminals 110. Scrum applications 200 on the wireless terminals 110 generate data packets of sampled audio streams which are sent to the collaborative speech processing computer 100 with identifiers of the wireless terminals 110 and/or the user names that have been registered in the scrum applications 200 and/or as user information registered in the wireless terminal settings. The collaborative speech processing computer 100 correlates mobile phone identifiers to scrum meeting attendees' names. The collaborative speech processing computer 100 sends the sampled audio streams to the remote networked natural language speech-to-text server 130, e.g., such as to APIs of natural language speech-to-text servers provided by Google, Apple, and/or Microsoft. The collaborative speech processing computer 100 receives responsive conversation text strings from the natural language speech-to-text server 130, and associates speaker identifiers with the conversation text. The conversation text strings are stored in a project database 102 or, more generally, in a dialog data structure in a repository memory, with speaker identifiers.

The radio access network 120 may be connected to the collaborative speech processing computer 100 through a data network 122, which may be part of the data network 124. In some other embodiments described below, instead of using wireless user terminals to sense voices, one or more microphones can be positioned among the users to provide audio streams that are sampled to generate the data packets provided to the collaborative speech processing computer 100. Although illustrated separately for ease of reference, one or more of the functions disclosed herein for the collaborative speech processing computer 100, the project database 102, and/or the natural language speech-to-text server 130 may be combined within a computer system 10.

Figure 2:
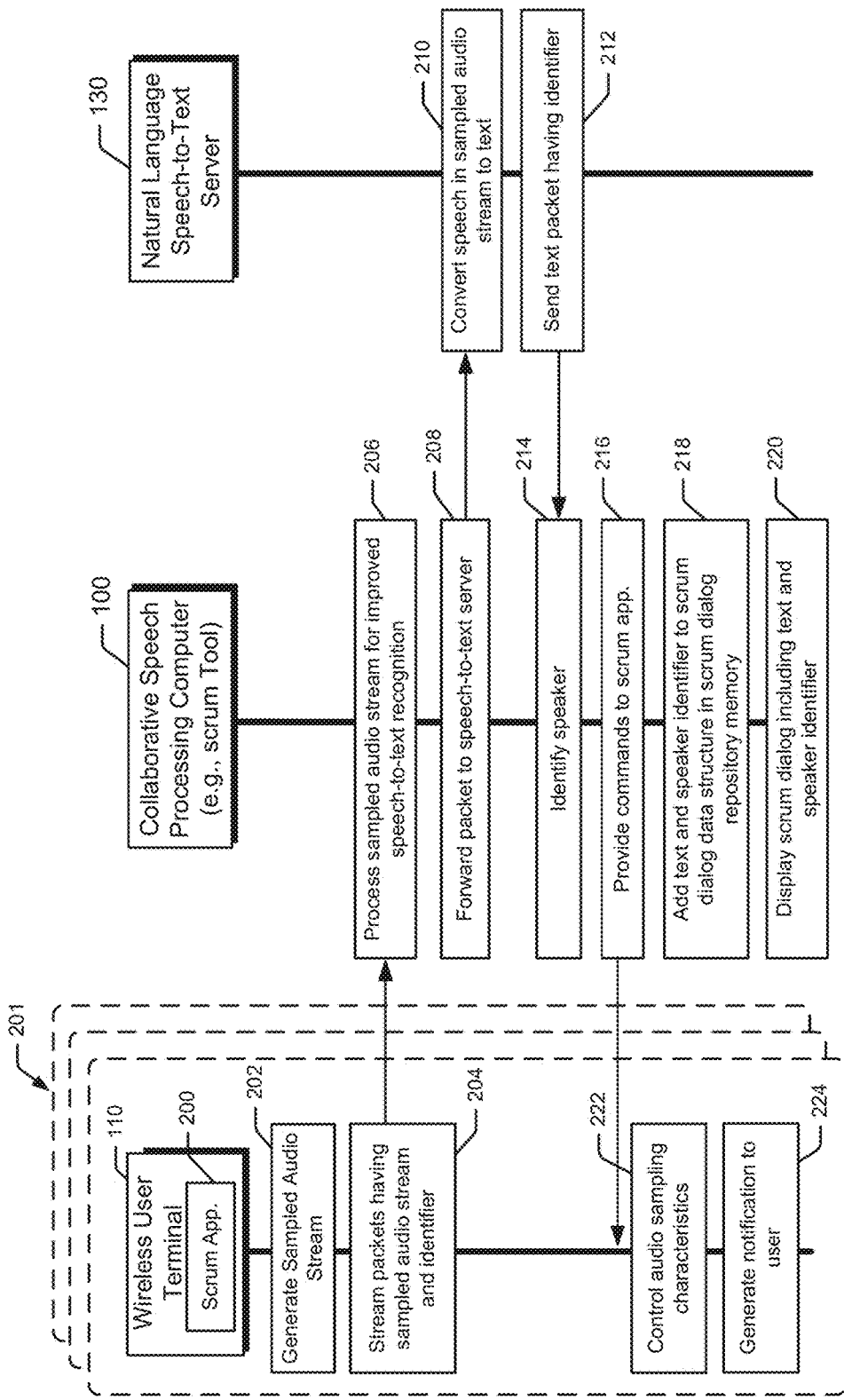
FIG. 2 is a combined data flow diagram and flowchart of operations that may be performed by user terminals, the collaborative speech processing computer, and the natural language speech-to-text server of FIG. 1 in accordance with some embodiments.

FIG. 2 is a combined data flow diagram and flowchart of operations that may be performed by wireless user terminals 110, the collaborative speech processing computer 100, and the natural language speech-to-text server 130 of FIG. 1 in accordance with some embodiments. Although single user terminal 110 is illustrated in FIG. 2, is be understood that the functionality illustrated therein may be replicated across a plurality of computer terminals 201.

Referring to FIG. 2, the wireless user terminal 110 executes a scrum application 200 that performs illustrated operations, which include generating 202 a sample audio stream from output of a microphone that may be part of the terminal or operationally interconnected thereto, e.g., Bluetooth headset. Data packets are generated that contain the sample audio stream and may further contain an identifier for the user terminal 110 and/or a registered user or other subscriber. The data packets are communicated (e.g. streamed) 204 to the collaborative speech processing computer 110, such as by packet radio communications through the radio access network 120 which are forwarded through the network 122.

The collaborative speech processing computer 100 receives the data packets containing the sampled audio streams from the wireless user terminal 110, and processes 206 the sampled audio streams for improved speech-to-text recognition. The processing can include filtering the sampled audio streams to remove noise and/or to increase the voice to background noise ratio for improved speech-to-text recognition capability. The data packets are forwarded 208 to the natural language speech-to-text server 130 via the data network 124. The forwarding 208 may include sending messages to the server 130 that provide the sample audio streams to a speech recognition application programming interface (API) of a speech recognition application executed by the server 130, e.g., such as to APIs of natural language speech recognition applications hosted by Google, Apple, and/or Microsoft.

The natural language speech-to-text server 130 recognizes and converts 210 speech in the sampled audio streams to text, and sends 212 data packets containing text strings, which are converted from the sampled audio streams, through the data network 124 to the collaborative speech processing computer 100.

The collaborative speech processing computer 100 receives the data packets containing the text strings, and identifies 214 speakers who are associated with the text strings contained in the data packets. For example, the collaborative speech processing computer 100 may process the text string contained in a receive data packet using one or more of operations described below regarding FIGS. 3 and/or 4 to identify the person who's voice is captured in the sampled audio stream that became converted to that text string. As will be described in further detail below, various further embodiments are directed to operations for dynamically identifying speakers during meetings, such as during scrum group discussions, and correlating the speaker identifiers with the text segments that are later returned by the natural language speech-to-text server performing natural language speech-to-text conversion.

One or more commands can be provided 216 to the scrum application 200 to perform operations that are further described below, which can include: 1) generating an interruption warning message to one of the speakers who is identified as having interrupted one or more other speakers at least a threshold number of times; 2) sending a command to increase amplification gain (e.g., amplify amplitude of voice) or decrease (e.g., decrease amplitude of voice) applied to audio signals from the microphone of the wireless user terminal 110; 3) sending a microphone mute command to the wireless user terminal 110 to trigger temporary muting of a microphone of the wireless user terminal 110; 4) sending a stream pause command to the wireless user terminal 110 to trigger the wireless user terminal 110 to cease sending further data packets containing a sampled audio stream; and/or 5) sending a stream resumption command to the wireless user terminal 110 to trigger the wireless user terminal 110 to resume sending further data packets containing a sampled audio stream. The wireless user terminal 110 can respond to one or more such commands by controlling 222 it's audio sampling characteristics, such as by controlling an amplification gain applied to audio signals from the microphone, muting the microphone signal, ceasing streaming of data packets of a sampled audio stream, and/or resuming streaming of data packets of a sampled audio stream. The wireless user terminal 110 may generate 224 a notification to a user, such as by displaying a notification message, outputting an audible notification through speaker, and/or generating a vibrational notification.

The collaborative speech processing computer 100 adds 218 the text strings and the identifiers of the associated speakers to a dialog data structure in a repository memory, which may reside in the project database 102. Content of at least a portion of the dialog data structure may be output to a display device for display 220.

As will be explained in further detail below, the collaborative speech processing computer 100 can rely on the results of querying the project database 102 (FIGS. 1, 3, and 4) to identify persons who are likely to have spoken the converted text strings. Identifying the speakers can be particularly advantageous for enabling tracking of progress toward completing project tasks, task issues raised by individual team members, and the contributions by individual team members toward those tasks. Moreover, audio signals from the identified task associated speakers may be handled operationally differently than those from other speakers.

In one embodiment, the operations for identifying one of the speakers associated with one of the text strings contained in the data packets, includes selecting a project task from among a plurality of project tasks that are defined in the project database 102 based on a closest matching of words in the one of the text strings to a set of keywords for the project task that is among sets of keywords that have been defined for the plurality of project tasks. The project database 102 can define a set of keywords that are associated with each project task (e.g., keywords corresponding to task descriptions, milestones, dates, product interfaces, supplier names, customer names, etc), and therefore different project tasks typically have different sets of keywords. The project database 102 can include a list of persons who are members of a project, can identify persons who are responsible for which tasks of a project, and can identify which sub-tasks each person is responsible for handling. The project database 102 may identify functional reporting structures, including which who is responsible for managing a project, task, and/or sub-task and overseeing progress by certain identified other persons. A person can therefore be identified as the speaker or as a candidate speaker from among a defined group of possible speakers who is/are associated by the project database 102 with the project task that was selected.

The operation for identifying 214 as the speaker a person who is defined in the project database 102 as being associated with the project task that is selected, can include comparing spectral characteristics of a voice contained in the sampled audio stream, which was converted to the one of the text strings, to spectral characteristics that are defined for a plurality of persons who are identified by the project database 102 as being associated with the project task selected, and then selecting one person as the speaker from among the plurality of persons, who are identified by the project database 102 as being associated with the project task selected, based on a relatively closeness of the comparisons of spectral characteristics.

In a further embodiment, the comparison of the spectral characteristics of the voice contained in the sampled audio stream to spectral characteristics that are defined for the persons who are defined by the project database 102 as being associated with the project task that was selected, can include comparing a spoken rate of words that are contained in the sampled audio stream, which was converted to the one of the text strings, to spoken rates of words that are defined for the plurality of persons who are defined by the project database 102 as being associated with the project task selected. For example, different persons can often be characterized by different speech rates (e.g., number of words spoken of a defined time period), and the characteristic speech rate for a defined person can be learned by the collaborative speech processing computer 100 and/or another system component and stored as information associated with that person's identifier in the project database 102.

In another further embodiment, the comparison of the spectral characteristics of the voice contained in the sampled audio stream to spectral characteristics that are defined for the persons who are defined by the project database 102 as being associated with the project task that was selected, can include comparing a frequency spectrum waveform in the sampled audio stream, which was converted to the one of the text strings, to frequency spectrum waveforms that are defined for the plurality of persons who are identified by the project database 102 as being associated with the project task that was. For example, different persons can often be characterized by different voice frequency spectrum waveforms (e.g., voice pitch and frequency waveform for various defined spoken words), and the characteristic voice frequency spectrum waveform for a defined person can be learned by the collaborative speech processing computer 100 and/or another system component and stored as information associated with that person's identifier in the project database 102.

More generally, the operation for identifying 214 a speaker can include comparing spectral characteristics of a voice contained in the sampled audio stream, which was converted to the one of the text strings, to spectral characteristics that are defined for a plurality of persons who are defined by the project database 102, and selecting one person as the speaker from among the plurality of persons who are defined by the project database 102 based on a relatively closeness of the comparisons of spectral characteristics.

The operation for adding 218 the text strings and the identifiers of the associated speakers to the dialog data structure in a repository memory, can include storing the one of the text strings and an identifier of the person selected to a dialog data structure in the project database 102 with a defined association to the project task that was selected.

Various other operations are directed to providing operational commands 216 to the user terminal 110 responsive to identification 214 of the speaker.

In one embodiment, the collaborative speech processing computer 100 identifies time over-lapping voices in the sample audio streams. Responsive to the identification of the time over-lapping voices, the computer 100 tracks which of the speakers has begun talking before another one of the speakers has stopped talking, and generates an interruption warning message that is provided to one six to the wireless user terminal 110 operated by the speaker who is identified as having interrupted one or more other speakers at least a threshold number of times. That's wireless user terminal 110 can generate 224 an associated notification to the user, such as by displaying a warning message to the user that cautions against interruption of other scrum meeting members and/or other persons involved in a discussion. These operations may be advantageous in that they can improve the speech recognition capability of the natural language speech-to-text server 130 by avoiding occurrence of combined overlapping voices in the sampled audio streams that could otherwise impede or prevent speech recognition operation.

In another embodiment, the collaborative speech processing computer 100 selects a project task from among a plurality of project tasks defined in the project database 102 based on closeness of matching (e.g., selecting the closest match) between words in one of the text strings to keywords defined for the project task, and identifies a plurality of persons who are defined in the project database 102 as being associated with the project task that was selected. The computer 100 can then select at least one wireless user terminal 110 that has been a source of one of the sampled audio streams and that is determined to not be licensed to one of the persons identified, and responsively send a microphone mute command to the at least one wireless user terminal 110 that was selected in order to trigger temporary muting of a microphone of the at least one wireless user terminal 110. In this manner, the collaborative speech processing computer 100 can control which wireless user terminals 110 are operating to stream voices or other audio. Wireless user terminals that are being operated by persons who have been defined in the project database 102 as being responsible for a particular task that determined as being discussed can have their voices streamed through their respective wireless user terminals 110, while other persons who are not defined in the project database 102 as being responsible for the particular task being discussed can have their voices muted by their respective wireless user terminals 110.

In another embodiment, the collaborative speech processing computer 100 selects a project task from among a plurality of project tasks defined in the project database 102 based on closeness of matching (e.g., selecting the closest match) between words in one of the text strings to keywords defined for the project task, and identifies a plurality of persons who are defined in the project database 102 as being associated with the project task selected. The computer 100 then selects at least one wireless user terminal 110 that has been a source of one of the sampled audio streams and that is determined to not be licensed to one of the persons identified, and sends a stream pause command to the at least one wireless user terminal 110 selected in order to trigger the at least one wireless user terminal 110 to cease sending further data packets containing a sampled audio stream. Accordingly, a wireless user terminal that is being operated by a person who is not defined in the project database 102 as being responsible for a particular task that determined as being discussed can be controlled to stop sending data packets containing sampled audio streams, which can reduce the operational processing by the collaborative speech processing computer 100 and by the natural language speech-to-text server 130, decrease the data communication utilization of the network 124 and the network 122, decrease the wireless communication resources that are provided by the radio access network 120 and being utilized by the wireless terminals 110, and decrease the possible erroneous speech recognition of background noise that may otherwise be provided by the wireless user terminal 110 operated by that person.

In a further embodiment, responsive to occurrence of a defined event after sending of the stream pause command to the selected wireless user terminal 110, the collaborative speech processing computer 100 sends 216 a stream resumption command to the at least one wireless user terminal 110 that was selected in order to trigger the at least one wireless user terminal 110 to resume sending further data packets containing a sampled audio stream.

In another further embodiment, the operation for detecting occurrence of the defined event after sending of the stream pause command is based on determining that another project task has been selected from among the plurality of project tasks defined in the project database based on closeness of matching (e.g., selecting the closest match) between words in another one of the text strings received after sending of the stream pause command to keywords defined for the project task. Thus, when the converted text strings are compared to the keywords in the project database 102 and result in determination that the conversation is now concerning another project task, the collaborative speech processing computer 100 can responsively send the stream resumption command to the wireless user terminal(s) 110, which were earlier commanded to cease sending sampled audio stream data packets, to trigger those wireless user terminal(s) 110 to resume sending further data packets containing sampled audio streams.

In another further embodiment, when the packets of sampled audio streams are received from wireless user terminals 110, the collaborative speech processing computer 100 parses the packets to determine terminal identifiers of the wireless user terminals 110. Names of the speakers are determined based on the terminal identifiers, such as by using the terminal identifiers to look up subscriber names in a subscriber database. The subscriber database may be a cellular home subscriber registry that is queried using the mobile identifier for a cellular phone. The names of the speakers are embedded as metadata in files of the sampled audio streams forwarded to the speech-to-text conversion server 130, and the speakers who are associated with the text strings contained in the packets that are received are identified based on metadata returned by the speech-to-text conversion server 130.

Figure 3:
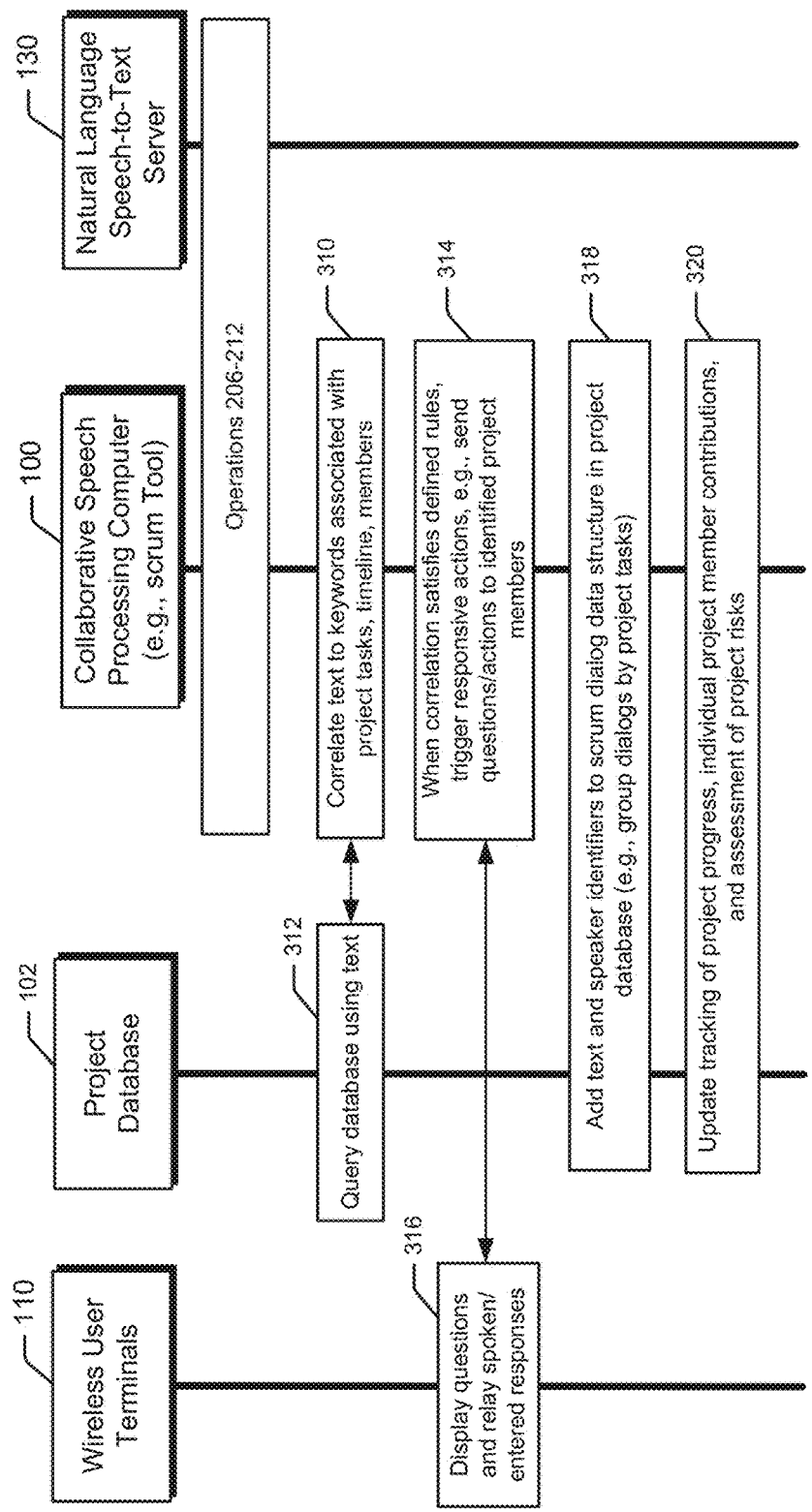
FIG. 3 is a combined data flow diagram and flowchart of some other operations that may be performed by user terminals, the collaborative speech processing computer, the natural language speech-to-text server, and the project database of FIG. 1 in accordance with some other embodiments.

FIG. 3 is a combined data flow diagram and flowchart of some other operations that may be performed by user terminals 110, the collaborative speech processing computer 100, the natural language speech-to-text server 130, and the project database 102 of FIG. 1 in accordance with some other embodiments.

Referring to FIG. 3, the collaborative speech processing computer 100 and the natural language speech-to-text server 130 can perform the operations 206-212 described above for FIG. 2. The collaborative speech processing computer 100 can correlate 310 text contained in the text strings converted by the server 130 to keywords that are associated with project tasks, project timelines, and/or project members. The collaborative speech processing computer 100 may query 312 the project database 102 using text that is parsed from the converted text strings to identify matches between the text and various keywords have been defined for the various project tasks, project timelines, and/or project members. When the correlation satisfies 314 one or more defined rules, the collaborative speech processing computer 100 can trigger responsive actions. The actions can include sending questions and/or notification messages to the wireless user terminals 110 for display 316 through a display device to associated users. The wireless user terminal 110 can responsively relay spoken and/or enter user responses to the collaborative speech processing computer 100 for processing and possible further actions. The actions can alternatively or additionally include operational commands that are sent to the wireless user terminals 1102 trigger operations it can include, as described above, adjusting gain that is applied to microphone signals, ceasing their sending of data packets containing sampled audio streams, and/or resuming their sending of data packets containing sampled audio streams.

The collaborative speech processing computer 100 adds 318 text and speaker identifiers to a dialogue data structure, e.g., scrum dialog data structure, in the project database 102. The collaborative speech processing computer 100 may alternatively or additionally update 320 tracking of project progress, individual project member contributions to the discussion of project tasks, and/or update an assessment of project risks based on the converted speech from the member discussions.

Figure 4:
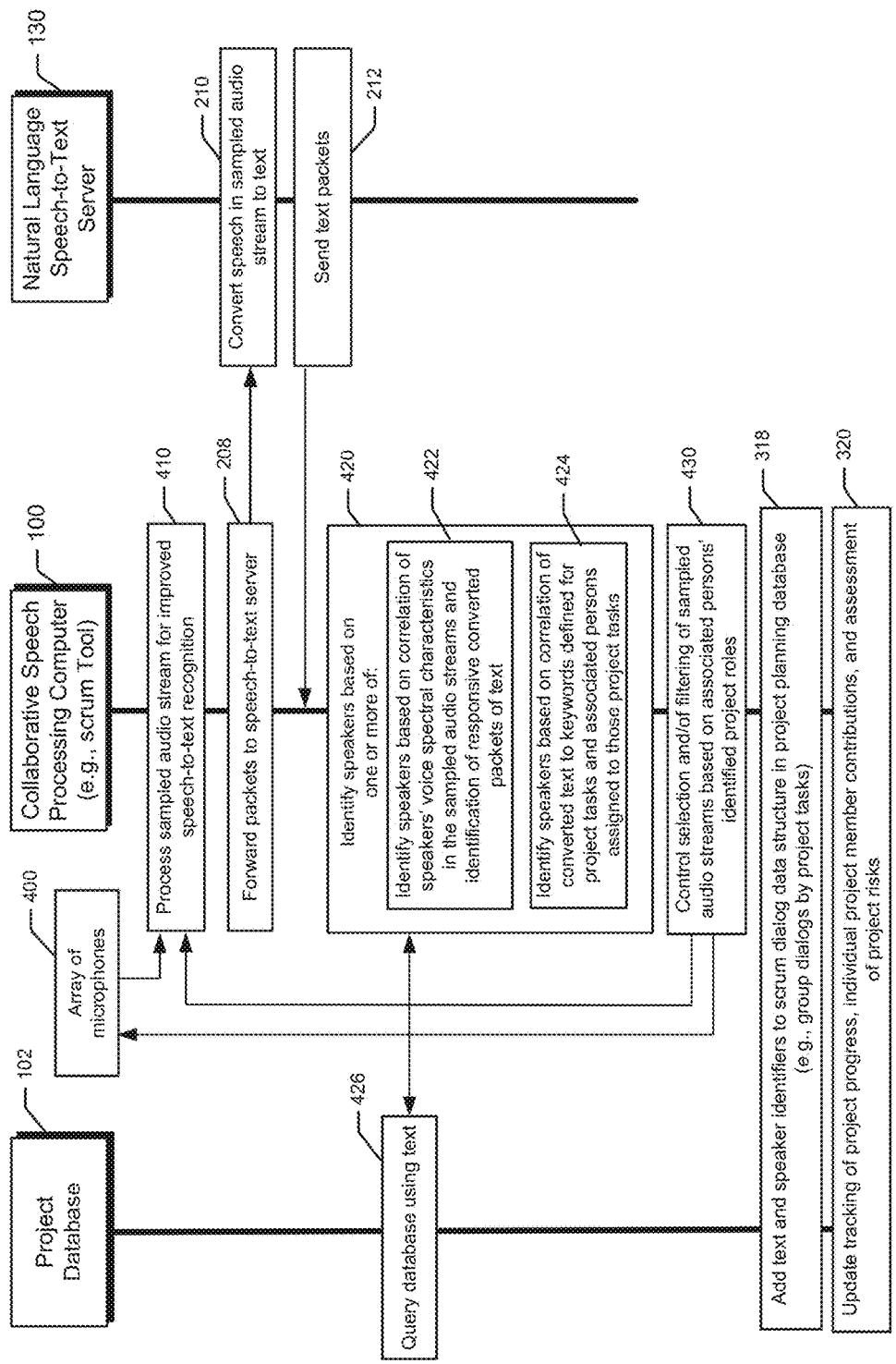
FIG. 4 is a combined data flow diagram and flowchart of some other operations that may be performed by an array of microphones, the project database, the collaborative speech processing computer, and the natural language speech-to-text server of FIG. 1 in accordance with some other embodiments.

FIG. 4 is a combined data flow diagram and flowchart of some other operations that may be performed by an array of microphones 400, the project database 102, the collaborative speech processing computer 100, and the natural language speech-to-text server 130 of FIG. 1 in accordance with some other embodiments.

Referring to FIG. 4, the microphones 400 may be spaced apart along a conference table to be adjacent to one or more meeting participants, and can be configured to have directional sensitivity aimed in a direction to sense one or more participant speakers in that direction while not sensing, or substantially attenuating, any speakers who are outside the adjacent cone-shaped region extending in that direction. Microphones 400 output an audio stream that may be digitally sampled by the microphones 400 or by other equipment, such as by a microphone input interface of the collaborative speech processing computer 100.

The collaborative speech processing computer 100 processes the sampled audio stream for improved speech-to-text recognition. The processing can include filtering the sampled audio streams to remove noise and/or to increase the voice to background noise ratio for improved speech-to-text recognition capability. The data packets are forwarded 208 to the natural language speech-to-text server 130 via the data network 124. The forwarding 208 may include sending messages to the server 130 that provide the sample audio streams to a speech recognition application programming interface (API) of a speech recognition application executed by the server 130. The APIs may correspond to those provided by natural language speech-to-text servers operated by Google, Apple, and/or Microsoft.

The natural language speech-to-text server 130 recognizes and converts 210 speech in one of the sampled audio streams to text, and sends data packets containing text strings, which are converted from the sampled audio stream, through the data network 124 to the collaborative speech processing computer 100.

The collaborative speech processing computer 100 receives the data packets containing the text strings, and identifies 420 speakers who's voice is captured in the sampled audio stream that became converted to a text string. For example, the collaborative speech processing computer 100 may dynamically identify speakers during meetings, such as during scrum group discussions, and correlate the speaker identifiers with the text segments that are later returned by the natural language speech-to-text server performing natural language speech-to-text conversion.

The collaborative speech processing computer 100 can rely on the results of querying the project database 102 to identify persons who are likely to have spoken the converted text strings. Identifying the speakers can be particularly advantageous for enabling tracking of progress toward completing project tasks, task issues raised by individual team members, and the contributions by individual team members toward those tasks.

In one embodiment, the operations for identifying one of the speakers associated with one of the text strings contained in the data packets, includes selecting 424 a project task from among a plurality of project tasks defined in the project database 102 based on a closest matching of words in the one of the text strings to a set of keywords for the project task that is among sets of keywords that have been defined for the plurality of project tasks. The computer 100 may identify unique words or combinations of words and the converted text string, which are then used to query 426 the project database 102 to select one of the project task defined therein that has, for example, a greatest level of matching between the queried words and the set of keywords to find for that project task. A person is then identified as the speaker who is defined in the project database 102 as being associated with the project task that was selected.

The operation for identifying 420 as the speaker a person who is defined in the project database 102 as being associated with the project task that is selected, can include comparing (correlating) 422 spectral characteristics of a voice contained in the sampled audio stream, which was converted to the one of the text strings, to spectral characteristics that are defined for a plurality of persons who are identified by the project database 102 as being associated with the project task selected, and then selecting one person as the speaker from among the plurality of persons, who are identified by the project database 102 as being associated with the project task selected, based on a relatively closeness of the comparisons of spectral characteristics.

In a further embodiment, the comparison 422 of the spectral characteristics of the voice contained in the sampled audio stream to spectral characteristics that are defined for the persons who are defined by the project database 102 as being associated with the project task that was selected, can include comparing a spoken rate of words that are contained in the sampled audio stream, which was converted to the one of the text strings, to spoken rates of words that are defined for the plurality of persons who are defined by the project database 102 as being associated with the project task selected. For example, different persons can often be characterized by different speech rates (e.g., number of words spoken of a defined time period), and the characteristic speech rate for a defined person can be learned by the collaborative speech processing computer 100 and/or another system component and stored as information associated with that person's identifier in the project database 102.

In another further embodiment, the comparison 422 of the spectral characteristics of the voice contained in the sampled audio stream to spectral characteristics that are defined for the persons who are defined by the project database 102 as being associated with the project task that was selected, can include comparing a frequency spectrum waveform in the sampled audio stream, which was converted to the one of the text strings, to frequency spectrum waveforms that are defined for the plurality of persons who are identified by the project database 102 as being associated with the project task that was. For example, different persons can often be characterized by different voice frequency spectrum waveforms (e.g., voice pitch and frequency waveform for various defined spoken words), and the characteristic voice frequency spectrum waveform for a defined person can be learned by the collaborative speech processing computer 100 and/or another system component and stored as information associated with that person's identifier in the project database 102.

More generally, the operation for identifying 214 a speaker can include comparing 422 spectral characteristics of a voice contained in the sampled audio stream, which was converted to the one of the text strings, to spectral characteristics that are defined for a plurality of persons who are defined by the project database 102, and selecting one person as the speaker from among the plurality of persons who are defined by the project database 102 based on a relatively closeness of the comparisons of spectral characteristics.

The collaborative speech processing computer 100 may operate to control 430 selection and/or filtering of sampled audio streams based on associated persons identify project roles.

In one embodiment, the collaborative speech processing computer 100 identifies time over-lapping voices in the sample audio streams. Responsive to the identification of the time over-lapping voices, the computer 100 tracks which of the speakers has begun talking before another one of the speakers has stopped talking. The computer 100 selects a microphone from among the array of microphones 400 which output audio signals contained in respective ones of the sampled audio streams, based on the microphone sensing voice from one of the speakers who is identified as having interrupted one or more other speakers at least a threshold number of times. The computer 100 responsively outputs 430 a control signal and/or filtering command signal to the selected microphone 400 that causes it to decrease amplification gain, (e.g., mute or decrease amplitude) applied to audio signals.

In another embodiment, the collaborative speech processing computer 100 selects a project task from among a plurality of project tasks defined in the project database 102 based on closeness of matching between words in one of the text strings to keywords defined for the project task, and identifies a person who is identified by the project database as being associated with the project task selected. The computer 100 then selects a microphone from among the array of microphones 400 that is determined to more strongly sense voice of the person identified relative to the other microphones, and responsively outputs 430 a control signal and/or filtering command signal to the selected microphone 400 that causes it to increase gain, (e.g., increasing amplitude and/or cease muting) applied to audio signals.

In a further operational embodiment, the computer 100 identifies persons who are defined in the project database as being associated with the project task selected. The computer 100 then selects a subgroup of the microphones that are determined to more strongly sense voices of those identified persons relative to the other ones of the microphones 400. The computer 100 controls 430 filtering of sampled audio streams from those selected microphones. The computer 100 may output a control signal and/or filtering command signal that causes the selected subgroup of microphones to increase the amplification gain applied to audio signals they are sensing for output as a streaming audio signal.

In some embodiments, the collaborative speech processing computer 100 operational controls 430 selection and/or filtering of sample audio streams by controlling operation for 10 the processing of the sample audio streams for speech-to-text recognition. For example, the computer 100 may choose to ignore, e.g., not further process for sending to the natural language speech-to-text server 130, audio streams from some microphones which are determined to be associated with sensing voices of persons who are not defined by the project database 102 as being associated with a project task that is currently being discussed. Alternatively, the computer 100 may send all audio streams to the natural language speech-to-text server 130 for conversion, but may only select text strings for addition to the dialogue data structure in the project planning database 102 that are determined to correspond to persons who are defined in the project database 102 as being associated with the project task that is being discussed. Selecting among which audio streams are processed and sent to the natural language speech-to-text server 130 for processing and/or selecting among which text strings are to be added to the dialogue data structure can reduce the operational processing by the collaborative speech processing computer 100 and by the natural language speech-to-text server 130, decrease the data communication utilization of the network 124 and the network 122, and decrease the possible erroneous speech recognition of background noise that may otherwise be created by persons don't have responsibility for the project task is presently being discussed.

The collaborative speech processing computer 100 adds 318 the text strings and the identifiers of the associated speakers to a dialog data structure in a repository memory, which may be a scrum meeting dialog data structure that resides in the project database 102.

The collaborative speech processing computer 100 may update 320 tracking of project progress, individual project member contributions to the discussion of project tasks, and/or update an assessment of project risks based on the converted speech from the member discussions. The dialogue data structure in the project database wanted to can thereby be mined for project planning, tracking progress attributable to individual team members, identifying risks with individual project deliverables, etc.

In one embodiment, the collaborative speech processing computer 100 selects a project task from among a plurality of project tasks defined in the project database 102 based on closeness of matching between words in one of the text strings to keywords defined for the project task, and identifies a plurality of persons who are defined in the project database 102 as being associated with the project task that was selected. The computer 100 can then select at least one wireless user terminal 110 that has been a source of one of the sampled audio streams and that is determined to not be licensed to one of the persons identified, and responsively send 430 a microphone mute command to the at least one wireless user terminal 110 that was selected in order to trigger temporary muting of a microphone of the at least one wireless user terminal 110. In this manner, the collaborative speech processing computer 100 can control which wireless user terminals 110 are operating to stream voices or other audio. Wireless user terminals that are being operated by persons who have been defined in the project database 102 as being responsible for a particular task that determined as being discussed can have their voices streamed through their respective wireless user terminals 110, while other persons who are not defined in the project database 102 as being responsible for the particular task being discussed can have their voices muted by their respective wireless user terminals 110.

In another embodiment, the collaborative speech processing computer 100 selects a project task from among a plurality of project tasks defined in the project database 102 based on closeness of matching between words in one of the text strings to keywords defined for the project task, and identifies a plurality of persons who are defined in the project database 102 as being associated with the project task selected. The computer 100 then selects at least one wireless user terminal 110 that has been a source of one of the sampled audio streams and that is determined to not be licensed to one of the persons identified, and send a stream pause command to the at least one wireless user terminal 110 selected in order to trigger the at least one wireless user terminal 110 to cease sending further data packets containing a sampled audio stream. Accordingly, a wireless user terminal that is being operated by a person who is not defined in the project database 102 as being responsible for a particular task that determined as being discussed can be controlled to stop sending data packets containing sampled audio streams, which can reduce the operational processing by the collaborative speech processing computer 100 and by the natural language speech-to-text server 130, decrease the data communication utilization of the network 124 and the network 122, decrease the wireless communication resources that are provided by the radio access network 120 and being utilized by the wireless terminals 110, and decrease the possible erroneous speech recognition of background noise that may otherwise be provided by the wireless user terminal 110 operated by that person.

In a further embodiment, responsive to occurrence of a defined event after sending of the stream pause command to the selected wireless user terminal 110, the collaborative speech processing computer 100 sends 216 a stream resumption command to the at least one wireless user terminal 110 that was selected in order to trigger the at least one wireless user terminal 110 to resume sending further data packets containing a sampled audio stream.

In another further embodiment, the operation for detecting occurrence of the defined event after sending of the stream pause command is based on determining that another project task has been selected from among the plurality of project tasks defined in the project database based on closeness of matching between words in another one of the text strings received after sending of the stream pause command to keywords defined for the project task. Thus, when the converted text strings are compared to the keywords in the project database 102 and result in determination that the conversation is now concerning another project task, the collaborative speech processing computer 100 can responsively send the stream resumption command to the wireless user terminal(s) 110, which were earlier commanded to cease sending sampled audio stream data packets, to trigger those wireless user terminal(s) 110 to resume sending further data packets containing sampled audio streams.

Figure 5:
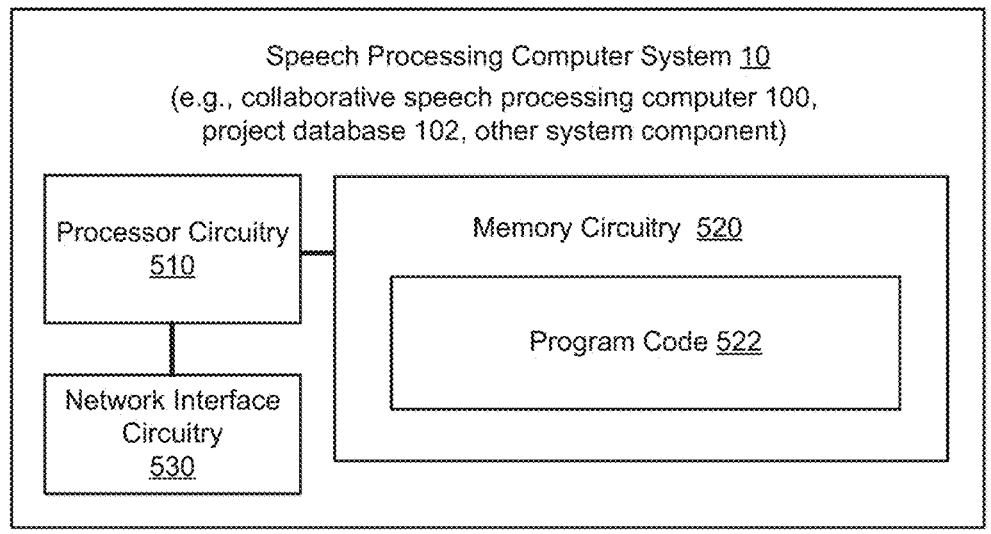
FIG. 5 is a block diagram of a speech processing computer system that is configured in accordance with some embodiments.

FIG. 5 is a block diagram of a speech processing computer system 10 that can be configured to perform operations in accordance with some embodiments. The system 10 can include the collaborative speech processing computer 100, the project database 102, and/or other system components configured to operate according one or more embodiments herein. Referring to FIG. 5, the system 10 can include network interface circuitry 530 which communicates via the one or more data networks 122 and/or 124 with the radio access network 120, the project database 102, the natural language speech-to-text server 130, and/or other components of the system 10. The system 10 includes processor circuitry 510 (hereinafter "processor") and memory circuitry 530 (hereinafter "memory") that contains computer program code nine twenty-two which performs various operations disclosed herein when executed by the processor 510. The processor 510 may include one or more data processing circuits, such as a general purpose and/or special purpose processor (e.g., microprocessor and/or digital signal processor), which may be collocated or distributed across one or more data networks (e.g., network(s) 124 and/or 122). The processor 510 is configured to execute computer program instructions among the program code 522 in the memory 520, described below as a computer readable medium, to perform some or all of the operations and methods for one or more of the embodiments disclosed herein.

Figure 6:
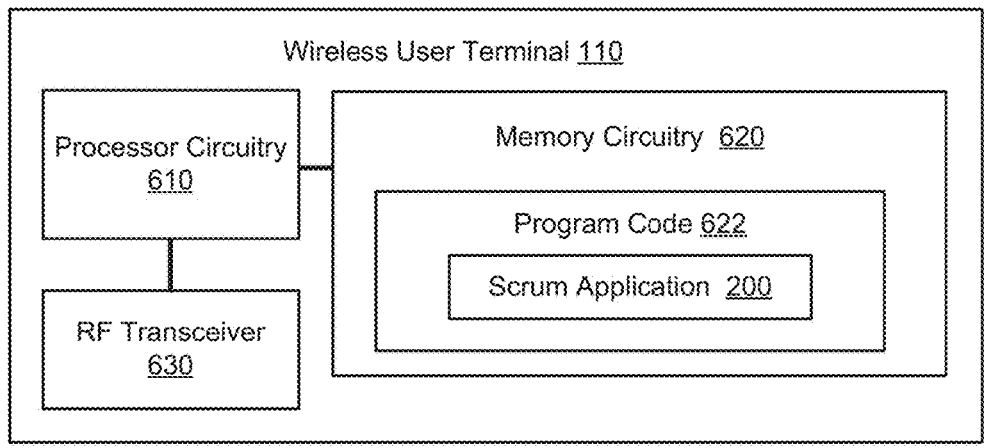
FIG. 6 is a block diagram of a user terminal that is configured in accordance with some embodiments.

FIG. 6 is a block diagram of a wireless user terminal 110 that can be configured to perform operations in accordance with some embodiments. Referring to FIG. 6, the terminal 110 can include a RF transceiver circuit 630 which use RF signaling according to one or more wireless communication protocols to communicate with the radio access network 120. The wireless communication protocols can include, but are not limited to, wireless local area network (e.g., IEEE 802.11), Bluetooth, and/or one or more 3GPP cellular communication protocols such as 4G, 5G, etc. The terminal 110 includes processor circuitry 610 (hereinafter "processor") and memory circuitry 620 (hereinafter "memory") that contains computer program code 622 which performs various operations disclosed herein when executed by the processor 610. Program code 622 can include the scrum application 200 described herein. The processor 610 may include one or more data processing circuits, such as a general purpose and/or special purpose processor (e.g., microprocessor and/or digital signal processor), which may be collocated or distributed across one or more data networks (e.g., network(s) 124 and/or 122). The processor 610 is configured to execute computer program instructions among the program code 622 in the memory 620, described below as a computer readable medium, to perform some or all of the operations and methods for one or more of the embodiments disclosed herein.

Further Definitions and Embodiments:

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus, and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" or "/" includes any and all combinations of one or more of the associated listed items.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method by a collaborative speech processing computer, the method comprising:
    obtaining data packets of sampled audio streams, wherein the packets of sampled audio streams are received from wireless user terminals;
    parsing the packets to determine terminal identifiers of the wireless user terminals;
    determining names of speakers based on the terminal identifiers;
    forwarding the sampled audio streams to a speech-to-text conversion server via a data network, wherein the names of the speakers are embedded as metadata in files of the sampled audio streams forwarded to the speech-to-text conversion server;
    receiving, via the data network, data packets containing text strings converted from the sampled audio streams by the speech-to-text conversion server;
    identifying the speakers associated with the text strings contained in the data packets received based on metadata returned by the speech-to-text conversion server;
    adding the text strings and the identifiers of the associated speakers to a dialog data structure in a repository memory; and
    outputting content of at least a portion of the dialog data structure to a display device for display.

2. The method of claim 1, wherein identifying one of the speakers associated with one of the text strings contained in the data packets, comprises:
    selecting a project task from among a plurality of project tasks defined in a project database based on a closest matching of words in the one of the text strings to a set of keywords for the project task that is among sets of keywords that have been defined for the plurality of project tasks; and
    identifying as the speaker a person who is defined in the project database as being associated with the project task selected.

3. The method of claim 2, wherein identifying as the speaker a person who is defined in the project database as being associated with the project task that is selected, comprises:
    comparing spectral characteristics of a voice contained in the sampled audio stream, which was converted to the one of the text strings, to spectral characteristics that are defined for a plurality of persons who are identified by the project database as being associated with the project task selected; and
    selecting one person as the speaker from among the plurality of persons who are identified by the project database as being associated with the project task selected, based on a relative closeness of the comparisons of spectral characteristics.

4. The method of claim 3, wherein comparing spectral characteristics of a voice contained in the sampled audio stream that was converted to the one of the text strings to spectral characteristics that are defined for a plurality of persons who are identified by the project database as being associated with the project task selected, comprises:
    comparing a spoken rate of words contained in the sampled audio stream, which was converted to the one of the text strings, to spoken rates of words that are defined for the plurality of persons who are defined by the project database as being associated with the project task selected.

5. The method of claim 3, wherein comparing spectral characteristics of a voice contained in the sampled audio stream that was converted to the one of the text strings to spectral characteristics that are defined for a plurality of persons who are identified by the project database as being associated with the project task selected, comprises:
    comparing a frequency spectrum waveform in the sampled audio stream that was converted to the one of the text strings to frequency spectrum waveforms that are defined for the plurality of persons who are identified by the project database as being associated with the project task selected.

6. The method of claim 3, wherein adding the text strings and the identifiers of the associated speakers to a dialog data structure in a repository memory, comprises:
    storing the one of the text strings and an identifier of the person selected to a dialog data structure in the project database with a defined association to the project task selected.

7. The method of claim 1, wherein identifying one of the speakers associated with one of the text strings contained in the packets, comprises:
    comparing spectral characteristics of a voice contained in the sampled audio stream, which was converted to the one of the text strings, to spectral characteristics that are defined for a plurality of persons who are defined by a project database; and
    selecting one person as the speaker from among the plurality of persons who are defined by the project database, based on a relative closeness of the comparisons of spectral characteristics.

8. The method of claim 1, further comprising:
    identifying time over-lapping voices in the sample audio streams;
    responsive to the identification of the time over-lapping voices, tracking which of the speakers has begun talking before another one of the speakers has stopped talking; and
    generating an interruption warning message to one of the speakers who is identified as having interrupted one or more other speakers at least a threshold number of times.

9. The method of claim 1, further comprising:
identifying time over-lapping voices in the sample audio streams;
responsive to the identification of the time over-lapping voices, tracking which of the speakers has begun talking before another one of the speakers has stopped talking;
selecting a microphone from among a plurality of microphones which output audio signals contained in respective ones of the sampled audio streams, based on the microphone sensing voice from one of the speakers who is identified as having interrupted one or more other speakers at least a threshold number of times; and
decreasing gain applied to audio signals from the microphone selected.

10. The method of claim 1, further comprising:
selecting a project task from among a plurality of project tasks defined in a project database based on a closest matching of words in the one of the text strings to keywords defined for the project task;
identifying a person who is identified by the project database as being associated with the project task selected;
selecting a microphone from among a plurality of microphones that is determined to more strongly sense a voice of the person identified relative to the other microphones; and
increasing gain applied to audio signals from the microphone selected.

11. The method of claim 10, further comprising:
identifying a plurality of persons who are defined in the project database as being associated with the project task selected;
selecting microphones that are determined to more strongly sense voices of the persons identified relative to the other microphones; and
increasing gain applied to audio signals from the microphones selected.

12. A method by a collaborative speech processing computer comprising:
obtaining data packets of sampled audio streams;
forwarding the sampled audio streams to a speech-to-text conversion server via a data network;
receiving, via the data network, data packets containing text strings converted from the sampled audio streams by the speech-to-text conversion server;
identifying speakers associated with the text strings contained in the data packets;
adding the text strings and the identifiers of the associated speakers to a dialog data structure in a repository memory;
outputting content of at least a portion of the dialog data structure to a display device for display;
selecting a project task from among a plurality of project tasks defined in a project database based on a closest matching of words in the one of the text strings to keywords defined for the project task;
identifying a plurality of persons who are defined in the project database as being associated with the project task selected;
selecting at least one wireless user terminal that has been a source of one of the sampled audio streams and that is determined to not be licensed to one of the persons identified; and
sending a microphone mute command to the at least one wireless user terminal selected to trigger temporary muting of a microphone of the at least one wireless user terminal.

13. A method by a collaborative speech processing computer comprising:
obtaining data packets of sampled audio streams;
forwarding the sampled audio streams to a speech-to-text conversion server via a data network;
receiving, via the data network, data packets containing text strings converted from the sampled audio streams by the speech-to-text conversion server;
identifying speakers associated with the text strings contained in the data packets;
adding the text strings and the identifiers of the associated speakers to a dialog data structure in a repository memory;
outputting content of at least a portion of the dialog data structure to a display device for display;
selecting a project task from among a plurality of project tasks defined in a project database based on a closest matching of words in the one of the text strings to keywords defined for the project task;
identifying a plurality of persons who are defined in the project database as being associated with the project task selected;
selecting at least one wireless user terminal that has been a source of one of the sampled audio streams and that is determined to not be licensed to one of the persons identified; and
sending a stream pause command to the at least one wireless user terminal selected to trigger the at least one wireless user terminal to cease sending further data packets containing a sampled audio stream.

14. The method of claim 13, further comprising:
responsive to occurrence of a defined event after sending of the stream pause command, sending a stream resumption command to the at least one wireless user terminal selected to trigger the at least one wireless user terminal to resume sending further data packets containing a sampled audio stream.

15. The method of claim 14, further comprising:
detecting occurrence of the defined event after sending of the stream pause command based on determining that another project task has been selected from among the plurality of project tasks defined in the project database based on closeness of matching between words in another one of the text strings received after sending of the stream pause command to keywords defined for the project task.

16. The method of claim 1, further comprising:
storing the dialog data structure in a scrum meeting repository memory.

17. A collaborative speech processing computer comprising:
a network interface configured to communicate with a speech-to-text conversion server;
a processor connected to receive data packets from the network interface; and
a memory storing program instructions executable by the processor to perform operations comprising:
obtaining the data packets of sampled audio streams;
forwarding the sampled audio streams to the speech-to-text conversion server via the network interface;
receiving, via the network interface, data packets containing text strings converted from the sampled audio streams by the speech-to-text conversion server;

selecting a project task from among a plurality of project tasks defined in a project database based on a closest matching of words in the one of the text strings to a set of keywords for the project task that is among sets of keywords that have been defined for the plurality of project tasks;

identifying a group of candidate speakers who are defined in the project database as being associated with the project task selected;

comparing spectral characteristics of a voice contained in the sampled audio stream that was converted to the one of the text strings to known spectral characteristics that are defined for the candidate speakers in the group;

selecting one person as the speaker from among the candidate speakers in the group, based on a relative closeness of the comparisons of spectral characteristics;

selecting at least one wireless user terminal that is determined to have been a source of one of the sampled audio streams and that is determined to not be licensed to one of the candidate speakers in the group; and sending a microphone mute command to the at least one wireless user terminal selected to trigger temporary muting of a microphone of the at least one wireless user terminal.

18. A collaborative speech processing computer comprising:

a network interface configured to communicate with a speech-to-text conversion server;

a processor connected to receive data packets of sampled audio streams from the network interface; and a memory storing program instructions executable by the processor to perform operations comprising:

obtaining the data packets of sampled audio streams, wherein the packets of sampled audio streams are received from wireless user terminals;

parsing the packets to determine terminal identifiers of the wireless user terminals;

determining names of speakers based on the terminal identifiers;

forwarding the sampled audio streams to a speech-to-text conversion server via a data network, wherein the names of the speakers are embedded as metadata in files of the sampled audio streams forwarded to the speech-to-text conversion server;

receiving, via the data network, data packets containing text strings converted from the sampled audio streams by the speech-to-text conversion server;

identifying the speakers associated with the text strings contained in the data packets received based on metadata returned by the speech-to-text conversion server;

adding the text strings and the identifiers of the associated speakers to a dialog data structure in a repository memory; and outputting content of at least a portion of the dialog data structure to a display device for display.

* * * * *